US010683651B2

(12) United States Patent
Pomeroy et al.

(10) Patent No.: US 10,683,651 B2
(45) Date of Patent: *Jun. 16, 2020

(54) BIDET RINSE RING

(71) Applicant: MAG Aerospace Industries, LLC, Carson, CA (US)

(72) Inventors: James W. Pomeroy, Kirkland, WA (US); Roger Michael Wilbanks, Cerritos, CA (US); Christoph Goeschel, Seattle, WA (US); Joerg Stachowski, San Pedro, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,139

(22) Filed: Jan. 28, 2019

(65) Prior Publication Data

US 2019/0161951 A1 May 30, 2019

Related U.S. Application Data

(63) Continuation of application No. 15/901,188, filed on Feb. 21, 2018, now Pat. No. 10,227,765.
(Continued)

(51) Int. Cl.
*E03D 9/08* (2006.01)
*E03C 1/12* (2006.01)
(Continued)

(52) U.S. Cl.
CPC ............... *E03D 9/08* (2013.01); *B64D 11/02* (2013.01); *E03C 1/12* (2013.01); *E03C 2001/1213* (2013.01); *E03F 1/006* (2013.01)

(58) Field of Classification Search
CPC ..... E03D 9/08; E03C 1/12; E03C 2001/1213; E03F 1/006; B64D 11/02
(Continued)

(56) References Cited

U.S. PATENT DOCUMENTS 5,208,922 A 5/1993 Machinaga et al.
6,353,942 B1 3/2002 Pondelick et al.
(Continued)

FOREIGN PATENT DOCUMENTS

EP 1491693 A2 12/2004

OTHER PUBLICATIONS

International Patent Application No. PCT/US2018/018932, Search Report and Written Opinion, dated Jun. 12, 2018.
(Continued)

*Primary Examiner* — Tuan N Nguyen
(74) *Attorney, Agent, or Firm* — Kilpatrick Townsend & Stockton LLP

(57) ABSTRACT

Embodiments of the present disclosure relate generally to a toilet bidet system for use on a passenger transportation vehicle. In particular, there is described a bidet rinse ring that converts a standalone toilet to a combined toilet and bidet system. Designs find particular use onboard passenger transportation vehicles, such as aircraft. Such systems benefit from efficient space management and generally cannot support a separate toilet and bidet. The bidet rinse ring described herein may come factory-mounted on the toilet. In other examples, the bidet rinse ring may replace a standard rinse ring in order to retrofit an existing toilet.

20 Claims, 19 Drawing Sheets

Related U.S. Application Data

(60) Provisional application No. 62/461,446, filed on Feb. 21, 2017.

(51) Int. Cl.
*B64D 11/02* (2006.01)
*E03F 1/00* (2006.01)

(58) Field of Classification Search
USPC .......................... 4/316, 420.4, 443, 447, 448
See application file for complete search history.

(56) References Cited

U.S. PATENT DOCUMENTS

| | | | |
|---|---|---|---|
| 7,493,664 B2 | 2/2009 | Riccobon | |
| 8,060,953 B1 * | 11/2011 | Dorra | E03D 9/08 |
| | | | 4/447 |
| 8,291,525 B2 | 10/2012 | Pondelick et al. | |
| 8,819,875 B2 | 9/2014 | Guttau et al. | |
| 9,371,136 B2 | 6/2016 | Beach et al. | |
| 1,001,135 A1 | 7/2018 | Beach et al. | |
| 10,227,765 B2 * | 3/2019 | Pomeroy | B64D 11/02 |
| 2006/0265801 A1 | 11/2006 | Riccobon | |
| 2013/0152296 A1 | 6/2013 | Bickerstaffe et al. | |
| 2014/0208498 A1 | 7/2014 | Beach et al. | |

OTHER PUBLICATIONS

U.S. Appl. No. 15/901,188, Notice of Allowance, dated Oct. 29, 2018.

* cited by examiner

BIDET RINSE RING

CROSS REFERENCE TO RELATED APPLICATIONS

This application is a continuation of U.S. patent application Ser. No. 15/901,188, filed Feb. 21, 2018, titled "Bidet Rinse Ring," which application claims the benefit of U.S. Provisional Application Ser. No. 62/461,446, filed Feb. 21, 2017, titled "Bidet Rinse Ring," the entire contents each of which are hereby incorporated in their entireties by this reference.

FIELD OF THE DISCLOSURE

Embodiments of the present disclosure relate generally to a toilet bidet system for use on a passenger transportation vehicle. In particular, there is described a bidet rinse ring that converts a standalone toilet to a combined toilet and bidet system. Designs find particular use onboard passenger transportation vehicles, such as aircraft. Such systems benefit from efficient space management and generally cannot support a separate toilet and bidet. The bidet rinse ring described herein may come factory-mounted on the toilet. In other examples, the bidet rinse ring may replace a standard rinse ring in order to retrofit an existing toilet.

BACKGROUND

Engineers and designers of interiors for aircraft and other passenger transportation vehicles must be attuned to efficient space management, while also providing a comfortable and enjoyable experience for passengers. Lavatories of aircraft and other passenger transportation vehicles are notably small. This may even be the case on luxury or private vehicles.

Passengers from a number of countries and backgrounds travel via aircraft and other transportation vehicles throughout the world. Although the use of bidets has not generally or widely become standard in the United States, bidets are quite common in many other countries. Accordingly, it may be desirable to have a bidet-option provided in a lavatory of an aircraft or other transportation vehicle. In this case, it is desirable to provide a system for cleaning a passenger using the lavatory without requiring the space of providing a completely separate bidet.

Combination toilet and bidet systems have been designed for home (or land) use. These systems generally provide a casing or housing within the toilet bowl frame, which also supports water controls and other features. However, these toilet and bidet systems incorporate a number of features that are not possible to incorporate into an aircraft (or other vehicle) vacuum toilet. Other combination systems designed for aircraft have sought to modify the toilet seat itself with one or more bidet functions. Improvements are desired.

BRIEF SUMMARY

Embodiments of the invention described herein thus provide systems and methods for a toilet bidet system that has a bidet rinse ring configured to cooperate with a toilet frame, the bidet rinse ring comprising a wand housing and a wand support. The bidet rinse ring can replace a standard rinse ring of a vacuum toilet. The bidet system is provided with a bidet wand having wand jets designed to deliver rinse water to a user.

When not in use, the wand may be retracted into a wand housing that defines an interior garage space. The interior garage space or other area of the bidet system may provide a wand disinfection system. One example of such a disinfection system may be one or more UV LEDs positioned within the wand housing. The interior garage space may also feature a rinse bar comprising one or more rinse jets, or one or more individual rinse jets, or a combination thereof. A drive system is configured to actuate movement of the wand. Micro valves are configured to control water delivery through the bidet rinse ring.

It is possible to control the temperature of the water delivered to the user via a heating unit. The heating unit can be plumbed in line with one or more water supply lines. It is also possible to provide a dryer feature. The toilet bidet system can be customized by the user via a control panel with user controls configured to customize the temperature, pressure, direction, amount, or any combination thereof of rinse water delivered through the bidet rinse ring.

Further there is provided a toilet bidet system for a passenger transportation vehicle, comprising a bidet rinse ring comprising a wand housing, a wand comprising one or more wand jets, wherein the wand is fluidly cooperable with one or more water lines configured to deliver rinse water through the one or more wand jets, and a control panel with user controls configured to customize the temperature, pressure, direction, amount, or any combination thereof of the delivered rinse water. Embodiments find particular use onboard aircraft.

There is further provided a method of retrofitting an aircraft toilet to a toilet bidet system, comprising: replacing a standard rinse ring on the aircraft toilet with the bidet rinse ring described herein; connecting water lines to the wand; and installing a user control panel near the aircraft toilet.

DETAILED DESCRIPTION

Figure 1:
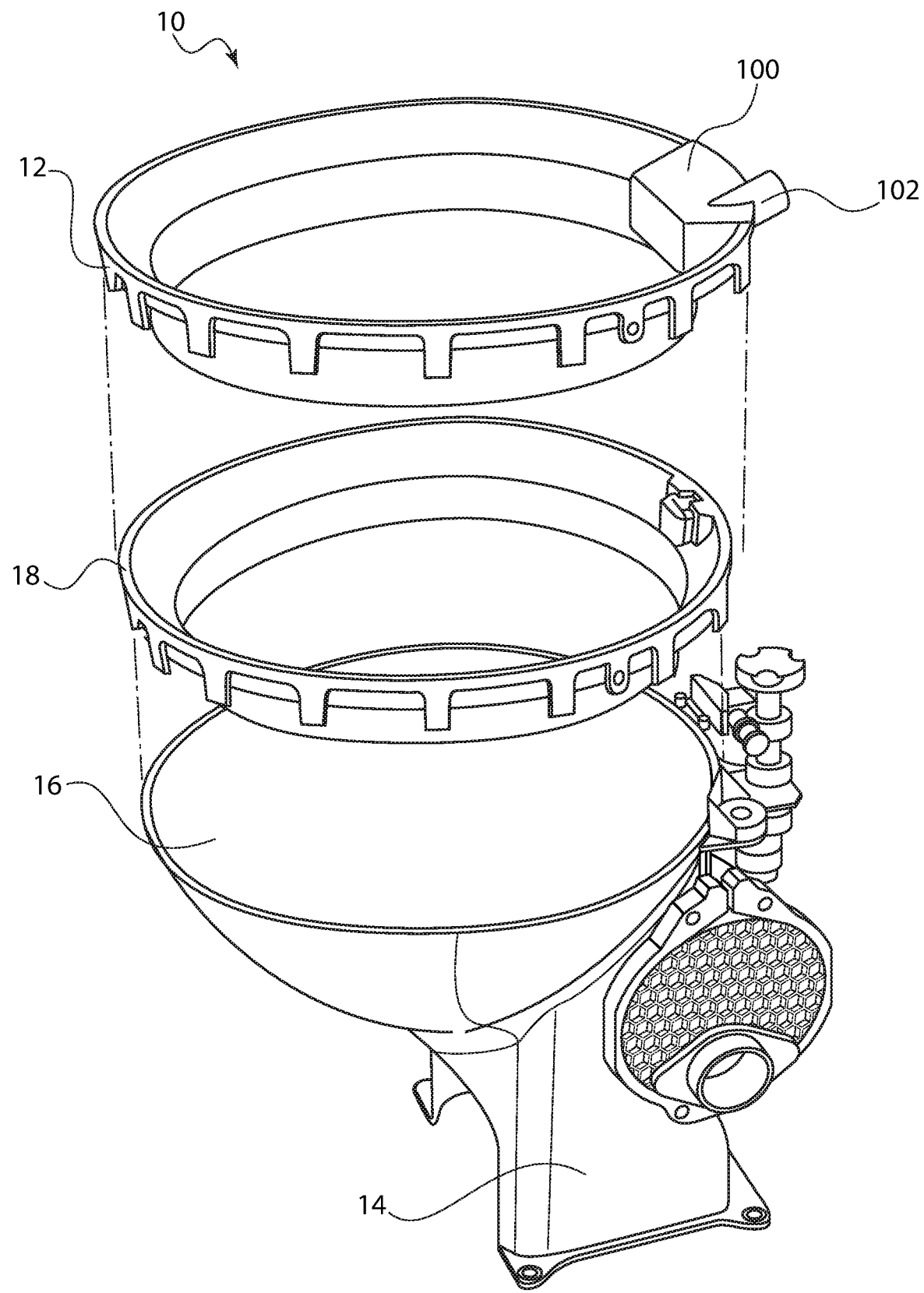
FIG. 1 shows an exploded perspective view of a toilet bidet system, illustrating removal of a standard rinse ring and its replacement by a bidet rinse ring.
Figure 2:
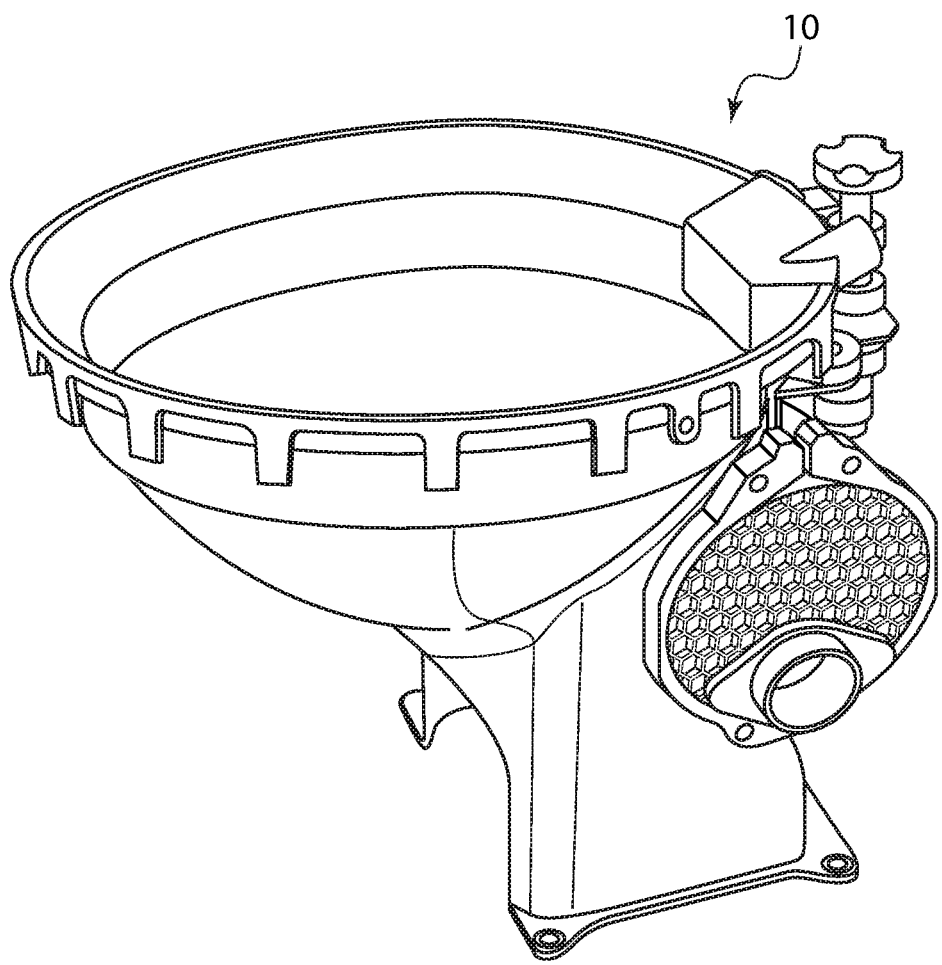
FIG. 2 shows a front perspective view of the toilet bidet system of FIG. 1, with a bidet rinse ring in position (prior to its assembly with the wand).

Embodiments of the present invention provide a toilet bidet system 10. The system 10 provides a bidet rinse ring 12 that is configured to cooperate with a toilet frame 14 and/or toilet bowl 16. The bidet rinse ring 12 may be used to replace a standard rinse ring 18 that is currently used with vacuum toilets. FIG. 1 illustrates a toilet frame 14 with a toilet bowl 16 positioned therein. The standard rinse ring 18 has been removed and is being replaced with the bidet rinse ring 12. FIG. 2 illustrates the toilet bidet system 10, with the bidet rinse ring 12 in place.

Referring now to the bidet rinse ring 12 of FIG. 1, the ring 12 is provided with a wand garage or housing 100 and a wand support 102. As described further below, the housing 100 houses or otherwise encloses one or more wands for delivering bidet water to a user. The wand support 102 provides a supported exit from the housing 100. The wand support 102 cooperates with the housing 100 and extends through a rear wall of the bidet rinse ring 12. In use, a rear portion of the wand is fluidly connected to one or more water lines that are configured to deliver fluid through the wand. The bidet rinse ring 12 has many features of a standard rinse ring 18, which are well-known and are not described herein. For example, the bidet rinse ring may have a similar toilet edge cooperation system, internal rinse water delivering ring or system, and/or other related features. In addition to those features, the bidet rinse ring 12 and provides the wand and bidet features described herein.

Figure 3:
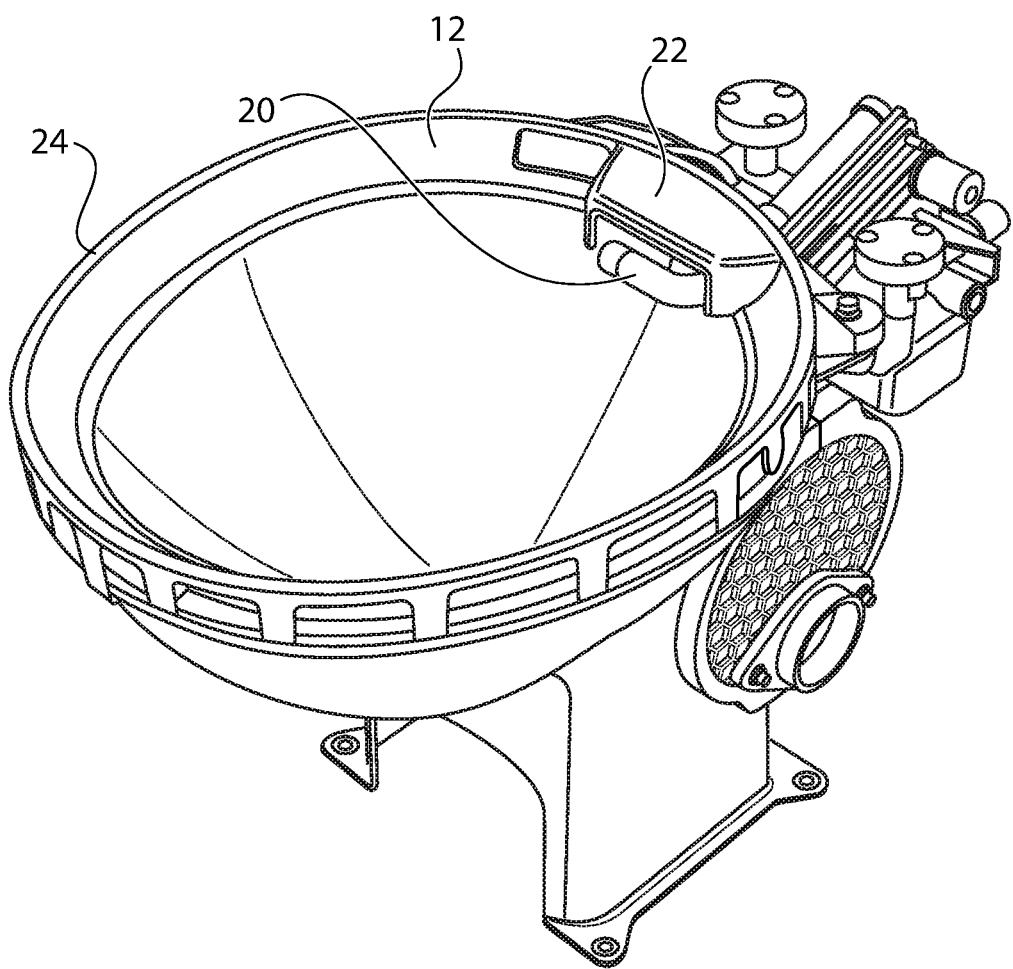
FIG. 3 illustrates a toilet bidet system with the wand in its stowed position.
Figure 4:
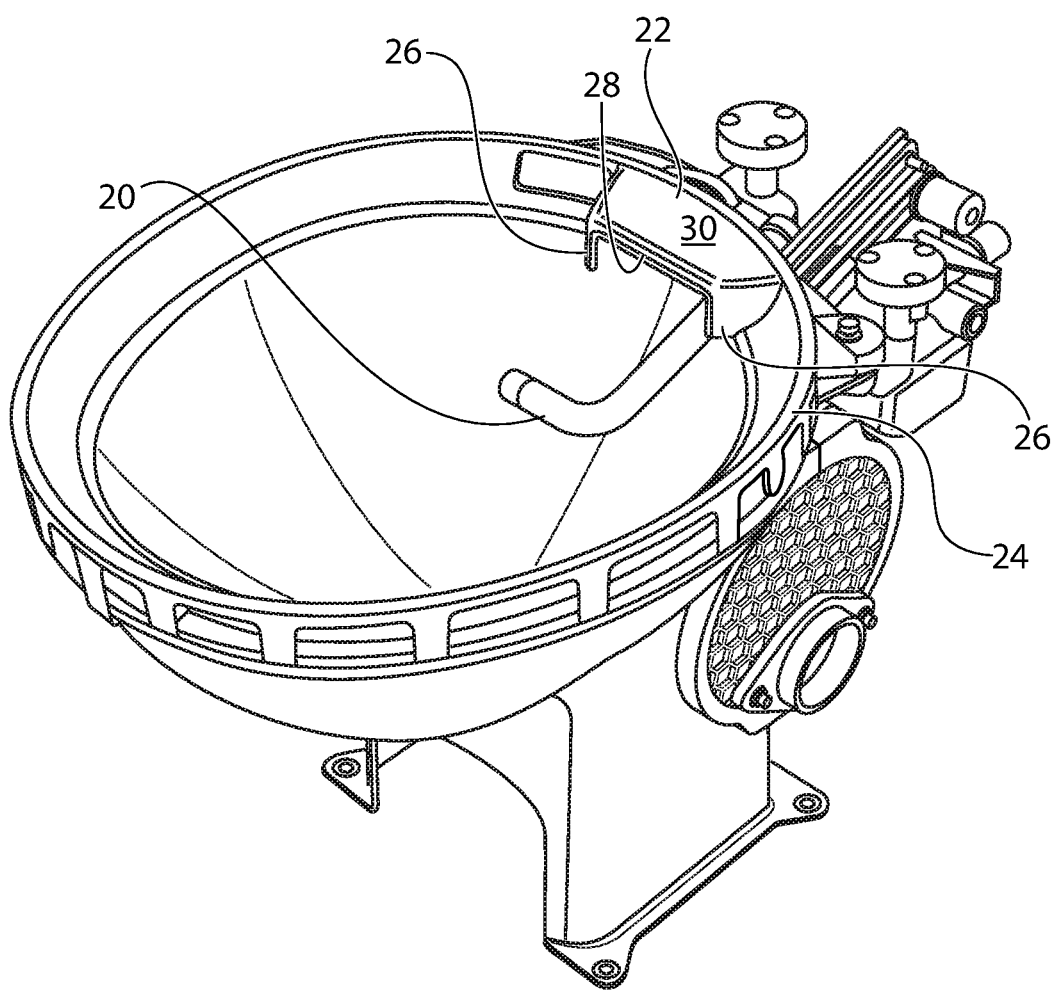
FIG. 4 illustrates a toilet bidet system with the wand in its deployed position.
Figure 5:
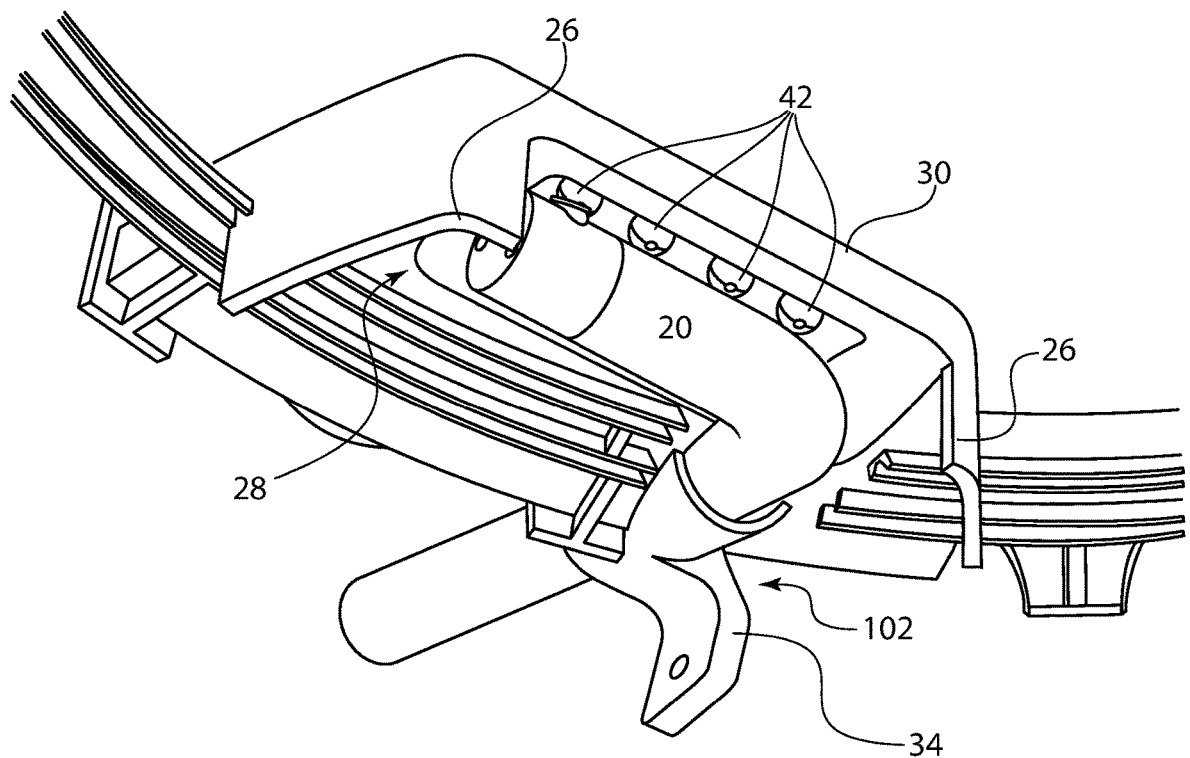
FIG. 5 illustrates a rear perspective view of the interior garage space with the wand in its stowed position.
Figure 7A:
FIG. 7A illustrates a transparent view of FIG. 6.
Figure 7B:
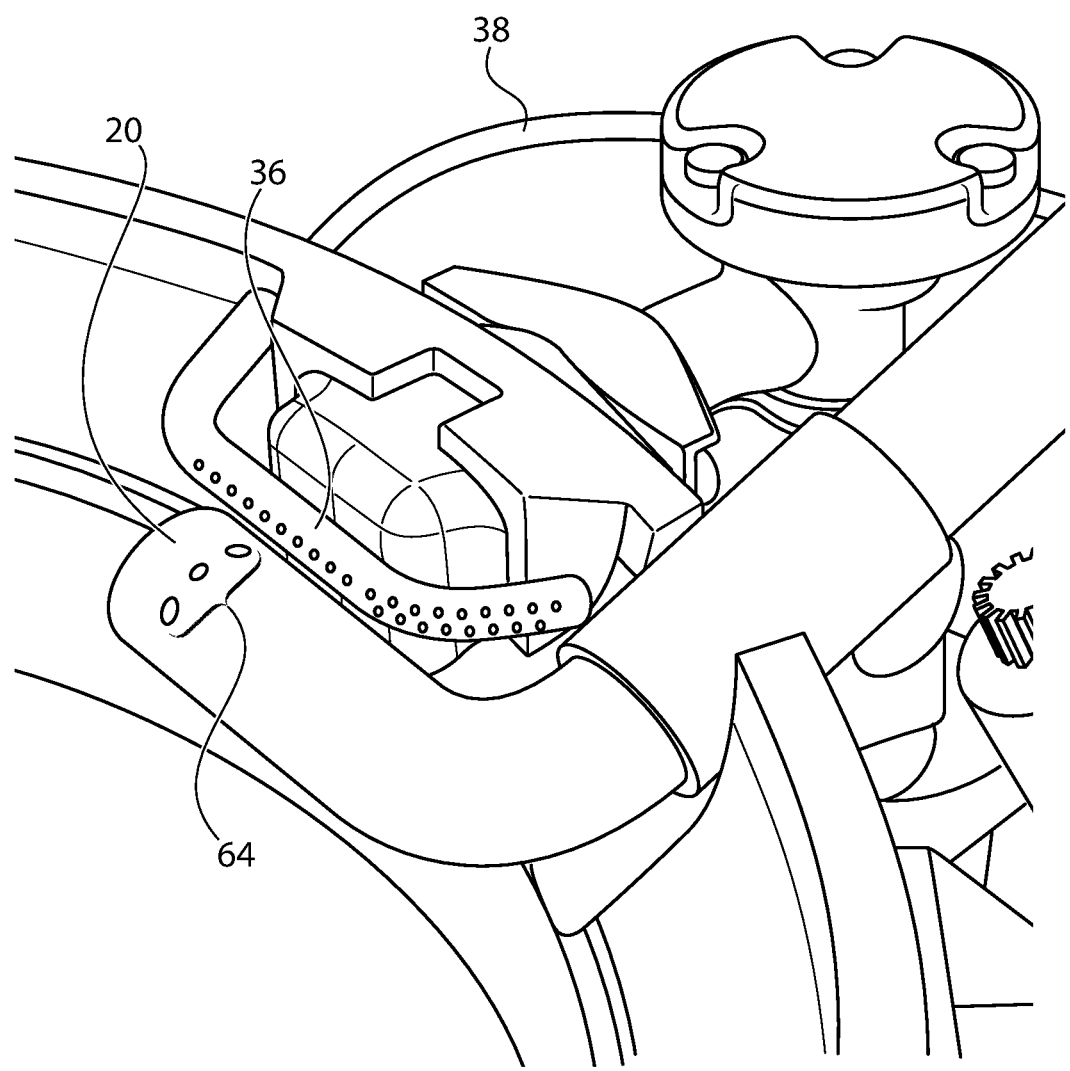
FIG. 7B illustrates the view of FIG. 6, with the garage closure removed.

Referring now to FIGS. 3 and 4, the bidet rinse ring 12 is provided with one or more wands 20. The images show a single wand 20, but it should be understood that more than one wand may be used if desired. FIG. 3 illustrates the wand 20 in its housed position. FIG. 4 illustrates the wand 20 in its extended/use position. When housed, the wand may be retracted into a wand housing 22. In the example shown, the wand housing 22 is formed generally continuously with the bidet ring circumference 24. The wand housing 22 may be defined by two downwardly extending flanges 26 and a ceiling 30, collectively defining an interior garage space 28. The interior garage space 28 may be open to the toilet bowl interior. For example, as illustrated by FIG. 5, the wand 20 is supported within the interior garage space 28 but accessible from therebelow. The interior garage space 28 may also house one or more rinse jets and/or one or more UV LEDs 42 for sterilization. In one example, one or more rinse jets 42 may be provided within the interior garage space 28 and may be used to clean the wand when stored. The rinse jets may be positioned along a rear portion of the garage. They may be in fluid communication with the same water source that provides rinse water to the wand for delivery to the user. In an alternate example, rinse jets may be positioned along a rinse bar 36, as illustrated by FIG. 7B.

If provided, the one or more UV LEDs 42 may be used to sterilize the entire wand 20 before and/or after use. It is also possible for the UV LEDs to add a desired illumination feature to the system, either for safety and/or for aesthetic purposes. Additionally or alternatively, alternate sterilization means may be provided. In some examples, silver oxide nanoparticles may be used to clean the wand. Positioning the sterilization system within the interior garage space 28 may help prevent passenger tampering as well as help provide passenger safety (e.g., by preventing UV light from reaching the user's eyes due to the presence of the garage ceiling 30).

Figure 6:
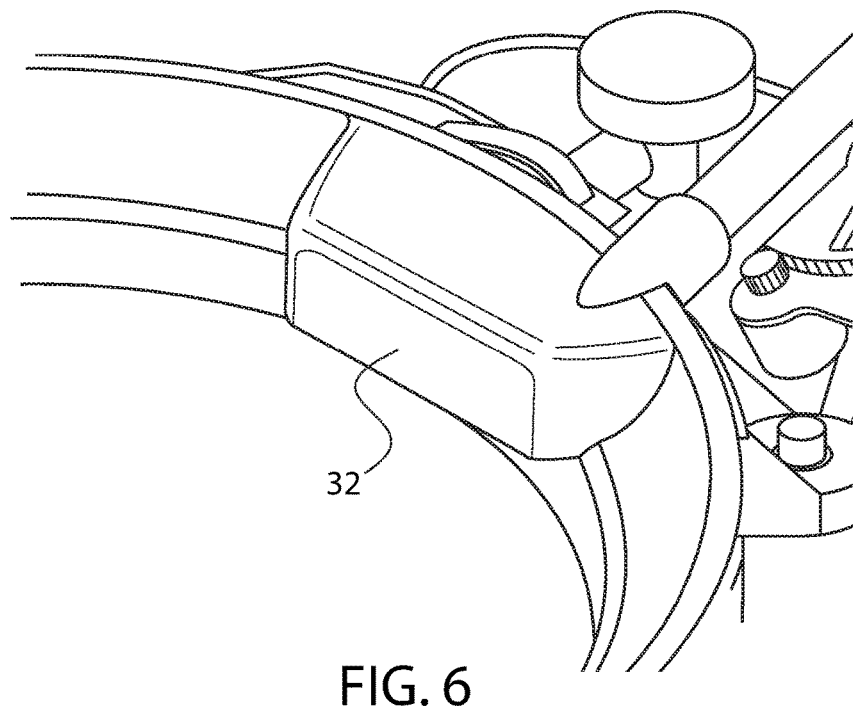
FIG. 6 illustrates a top perspective view of an interior garage space having a closure flap or door.

In alternate examples, the interior garage space 28 may be provided with a flap or door 32 which generally encloses the space 28. In this example, when the wand 20 is activated, its movement pushes open the flap or door 32. This embodiment is illustrated by FIGS. 6 and 7A.

The wand 20 is supported by a wand support 102 within the interior garage space 28. The wand support may feature a bracket 34 that may be used to help secure the bidet rinse ring 12 in place. As illustrated, the wand support 102 has a geometry that generally tracks the outer geometry of the wand. In the illustrated example, this geometry is circular, but it should be understood that alternate geometries (such as square, rectangular, oval, rounded triangular, triangular, or any other options) are possible and considered within the scope of this disclosure.

Figure 7C:
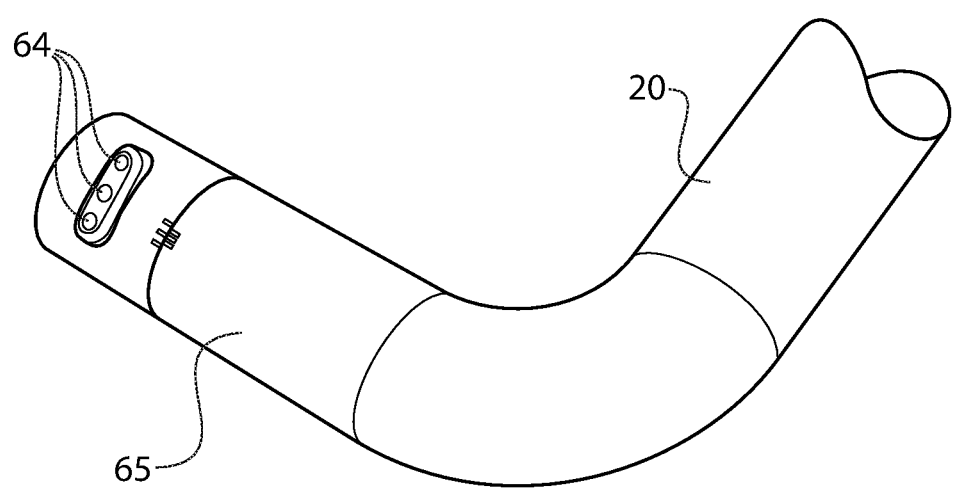
FIG. 7C illustrates a close up view of the wand and one embodiment of wand jets.

FIG. 7B illustrates the wand garage or housing 100 removed, showing a wand 20 used in cooperation with a rinse bar 36. As described above, the rinse bar 36 may deliver cleaning water or fluid to the clean the wand between uses. A fluid line 38 is shown that fluidly connects the rinse bar 36 with a water/cleansing fluid source. Rather than using a rinse bar 36, individual rinse jet or a plurality of rinse jets may be provided along a similar location. Wand 20 is also provided with one or more wand jets 64 for delivering rinse water directly to the user in use. FIG. 7C illustrates one embodiment of a wand 20 with wand jets 64. As shown, wand jets 64 may be positioned on a bent arm portion 65 of the wand 20 in order to provide an optimal angle for rinse water to be delivered to the user.

Figure 8A:
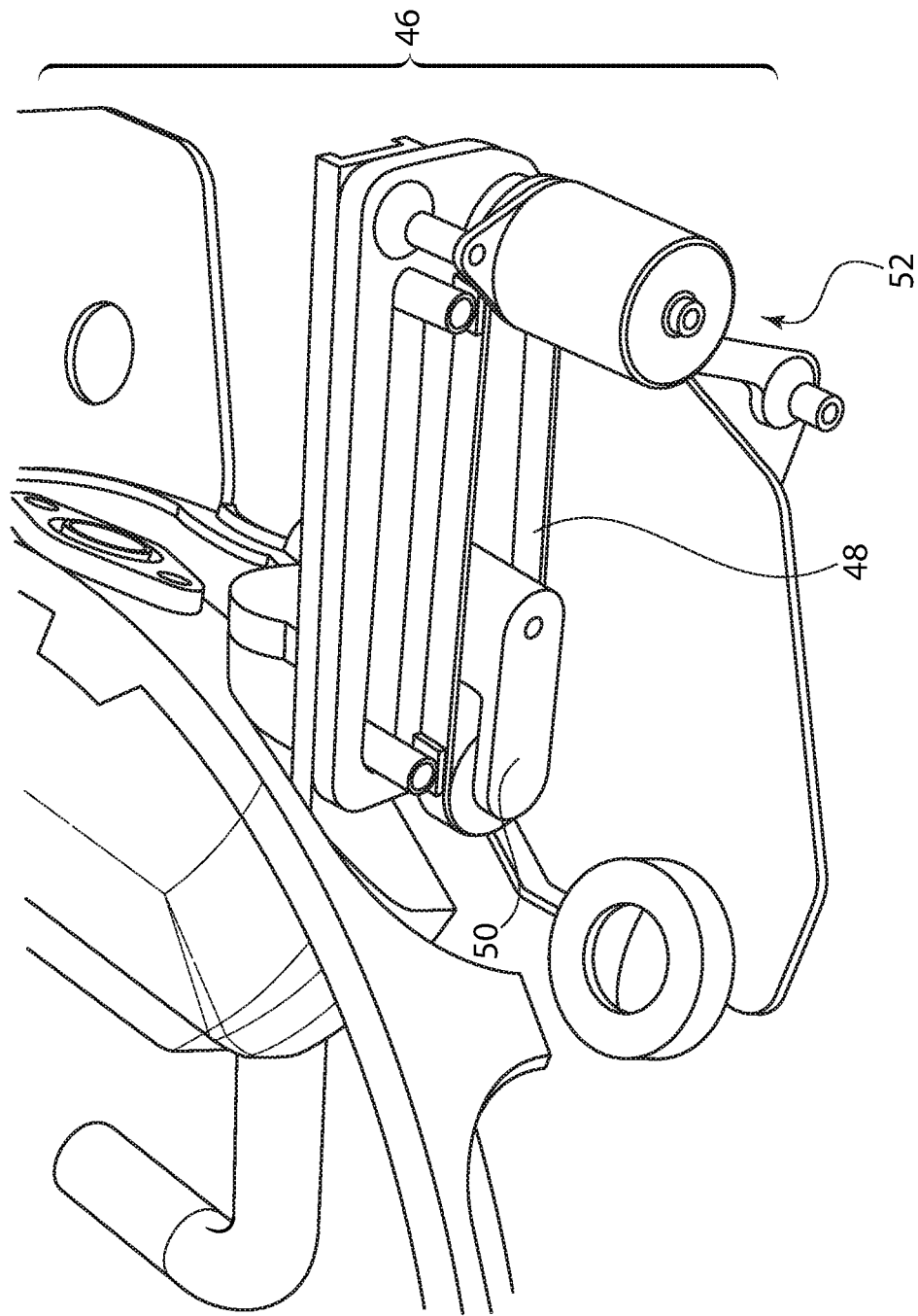
FIG. 8A illustrates a rear perspective view of one embodiment of a drive system for activating movement of the wand.
Figure 8B:
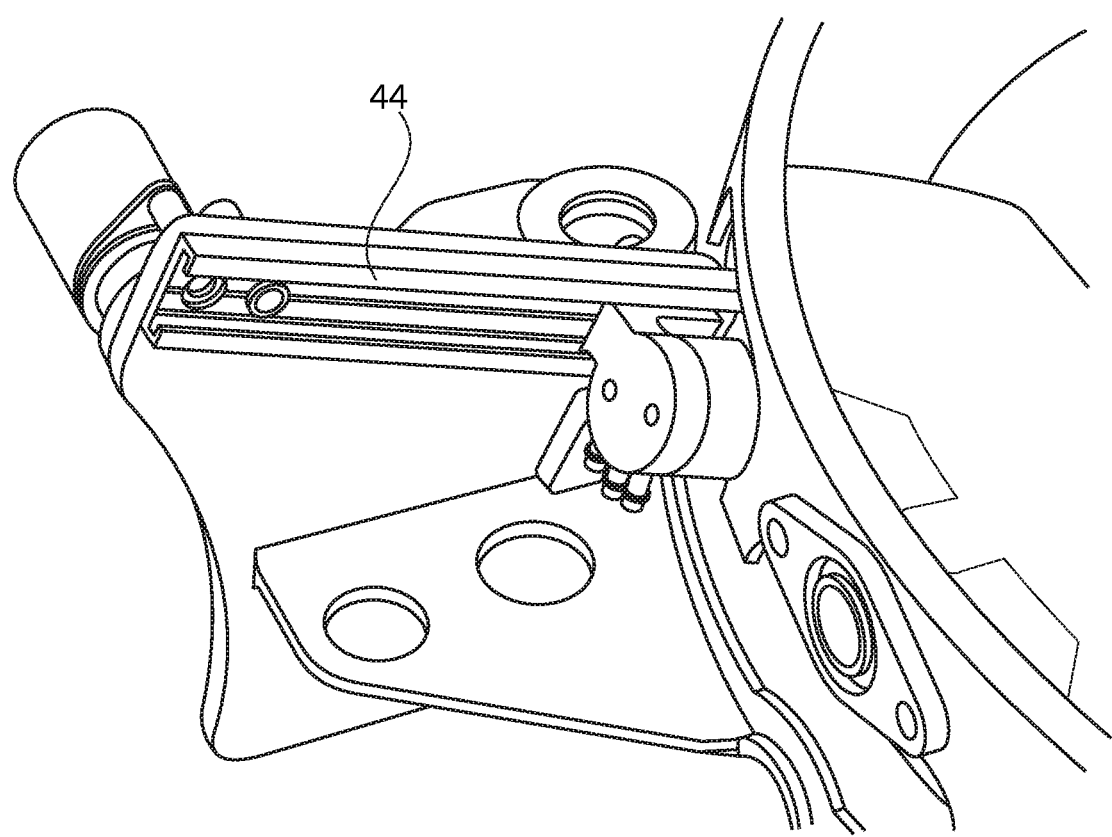
FIG. 8B illustrates a rear view of FIG. 8A, showing a wand track.

Mechanical operation of the wand 20 may be controlled via a drive system 46. The drive system 46 may be any appropriate system configured to extend and retract the wand 20. In the example illustrated by FIG. 8A, the drive system 46 features a toothed timing belt 48, a belt tensioner 50, and a stepper motor wand drive 52. The toothed timing belt 48 connects the motor 52 to the wand 20, and the belt tensioner 50 keeps the timing belt taught. The wand may be guided by a wand track 44, extended from a rear portion of a rear bidet mount on the toilet frame. One example of which is illustrated by FIG. 8B.

Figure 9:
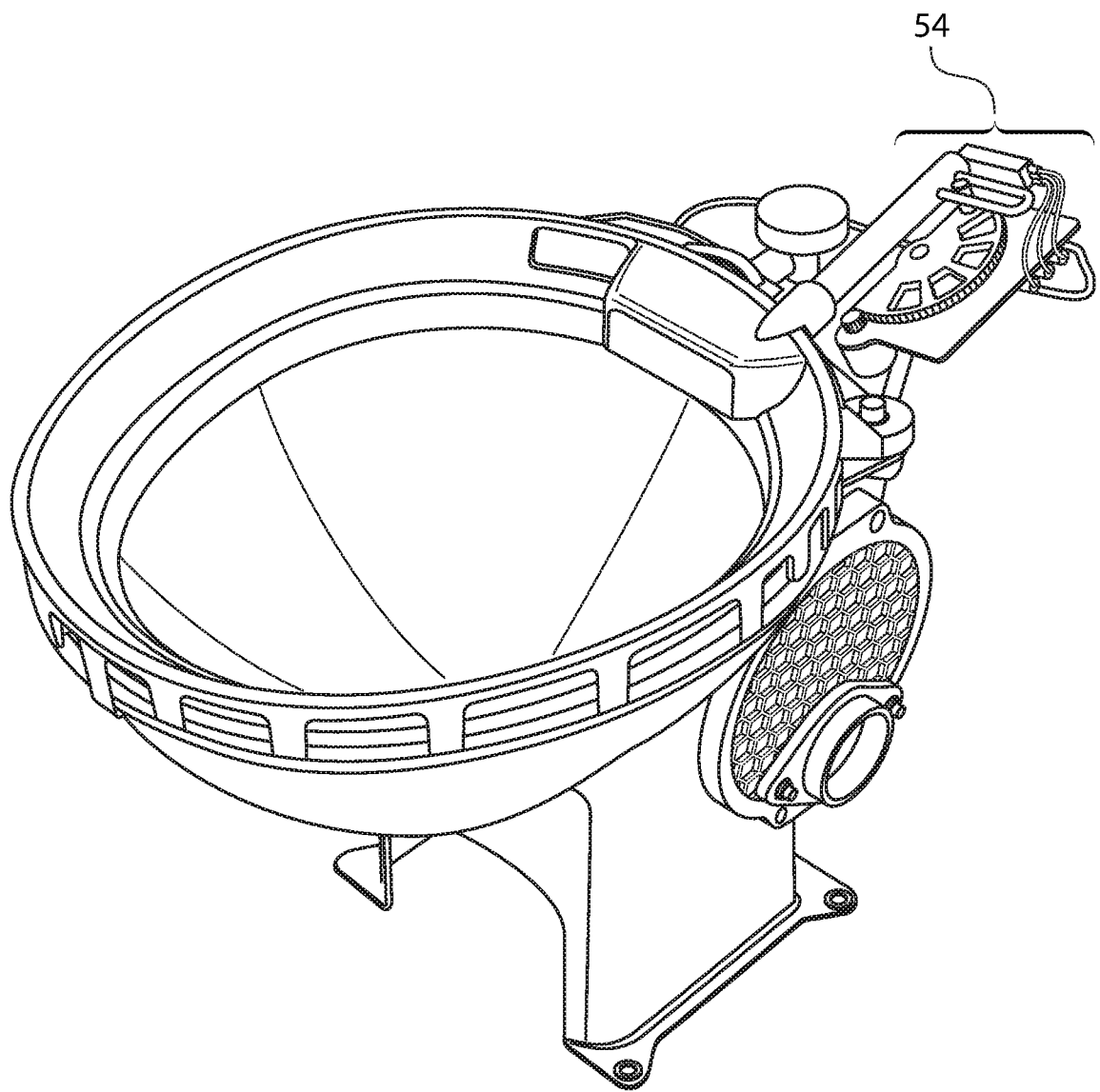
FIG. 9 illustrates the embodiment of FIG. 8 with the wand in its stowed position.
Figure 10:
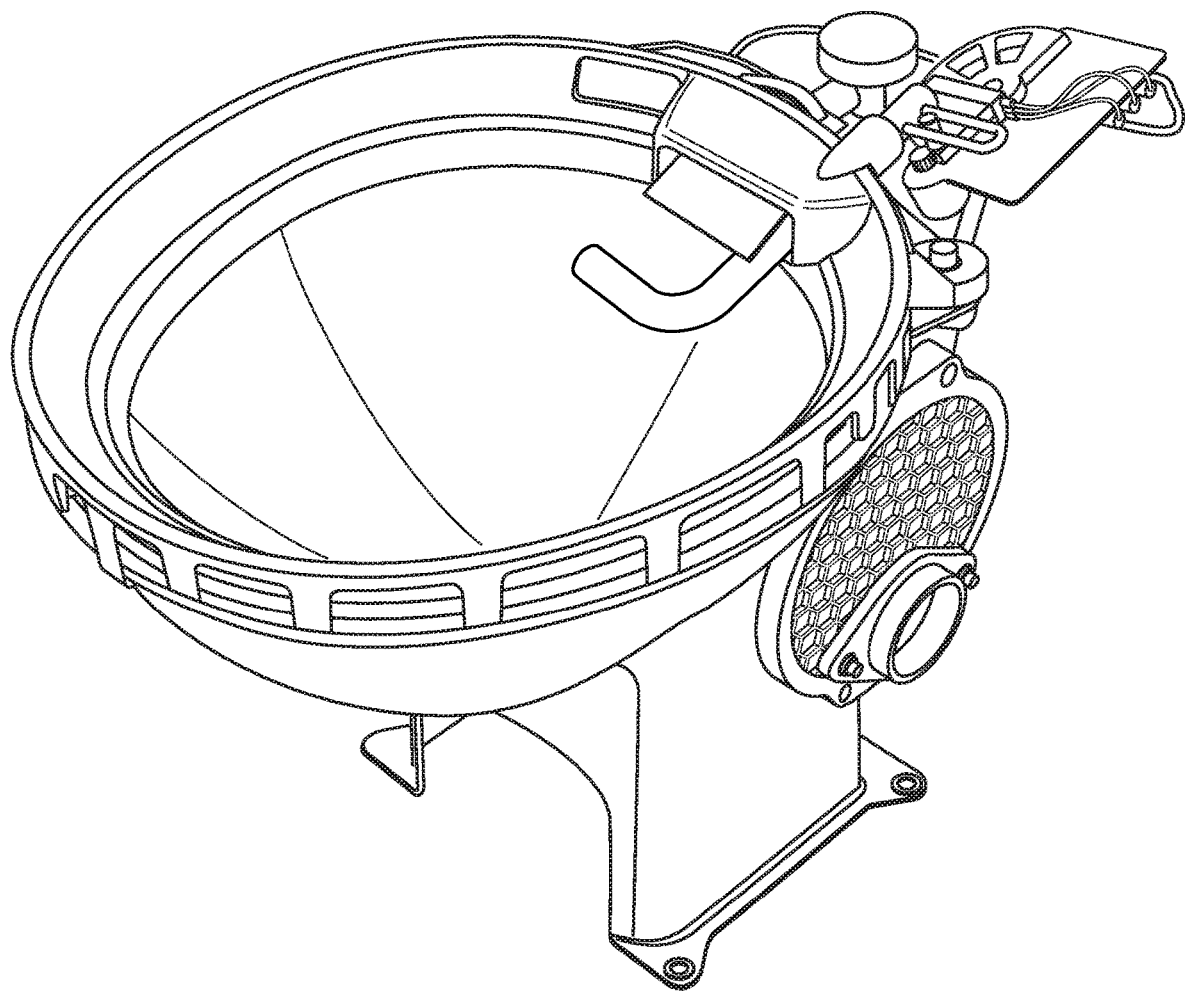
FIG. 10 illustrates the embodiment of FIG. 8 with the wand in its deployed position.
Figure 11A:
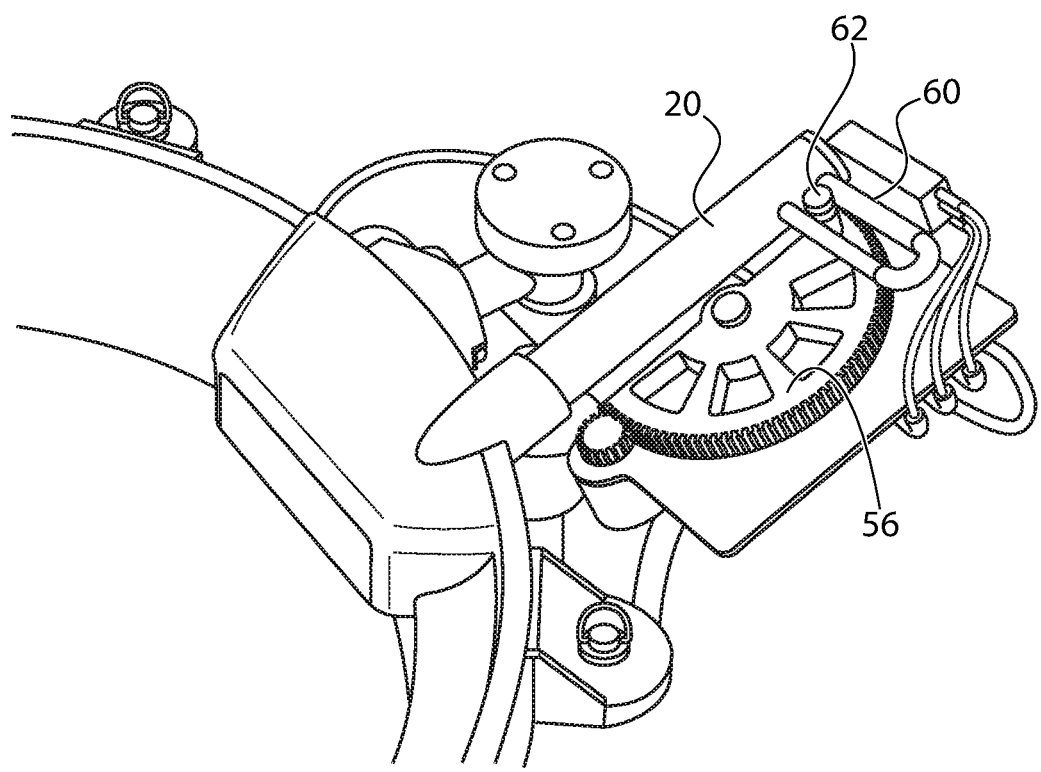
FIG. 11A illustrates the embodiment of FIG. 8 with the wand in its stowed position, illustrating a close-up of a geared drive system.
Figure 11B:
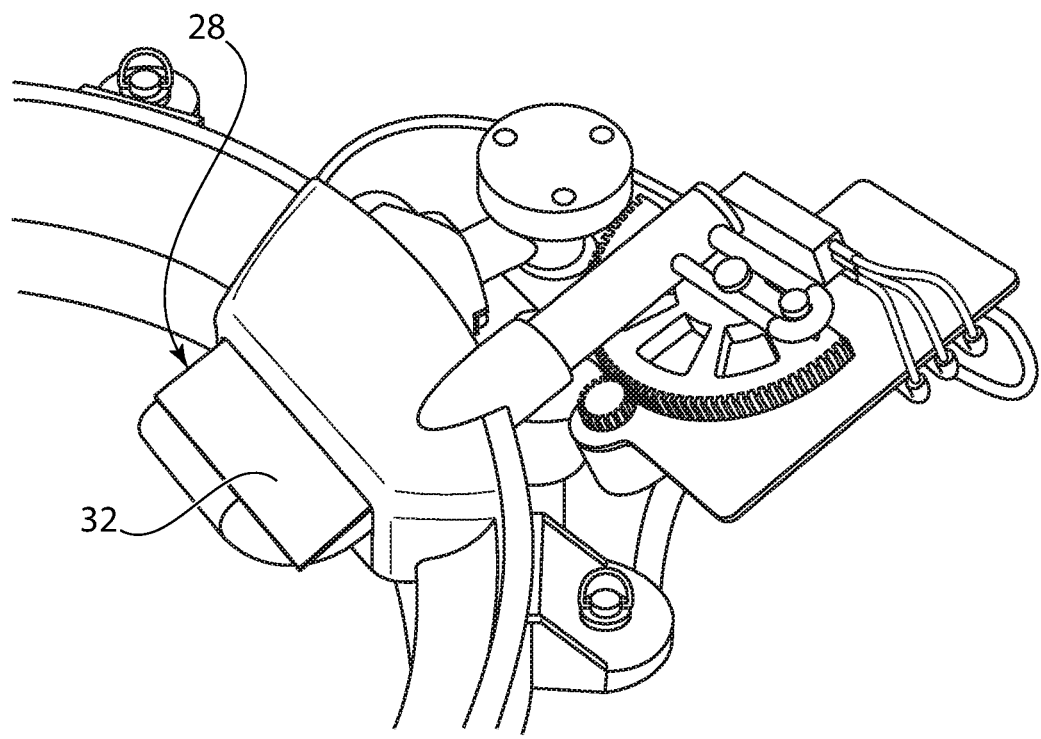
FIG. 11B illustrates the embodiment of FIG. 11A with the geared drive system activating movement of the wand.
Figure 11C:
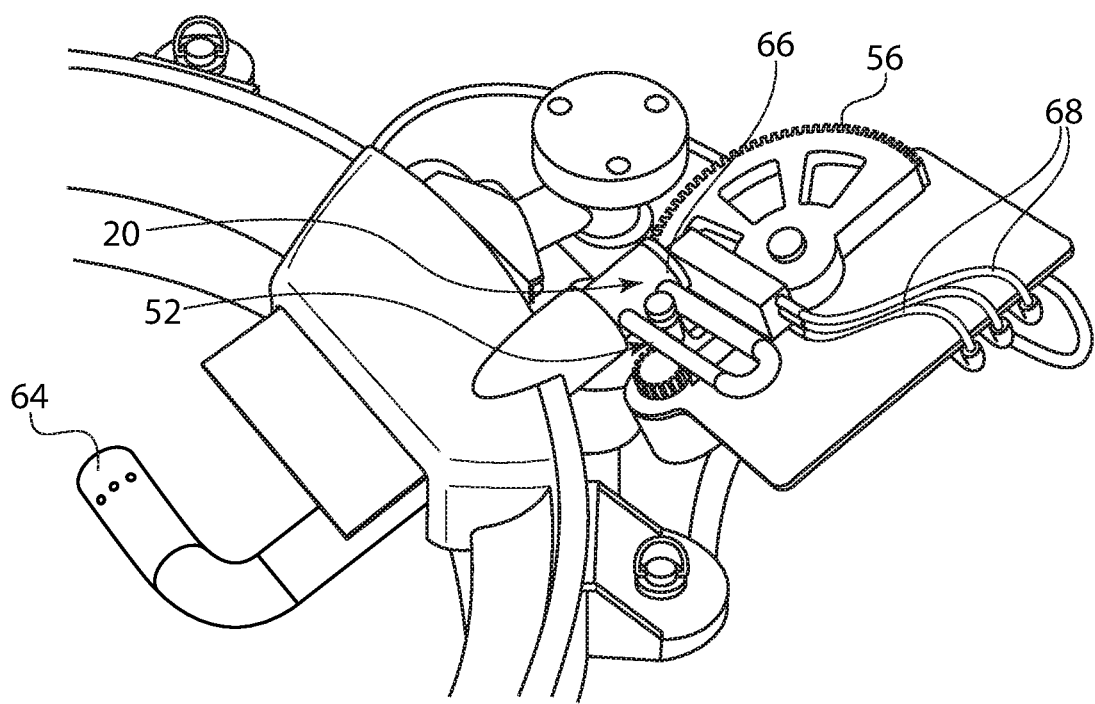
FIG. 11C illustrates the embodiment of FIG. 11A with the wand in its deployed position.

Other drive systems are possible and considered within the scope of this disclosure. For example, the alternate drive system illustrated by FIGS. 9-11 includes a gear system 54. The gear system 54 may operate to maneuver the wand 20 between its stowed position (FIG. 9) and its extended position (FIG. 10) via a rotating gear 56 and motor 58. In the example illustrated, the gear 56 is a moon gear (i.e., shaped as a half circle moon). Also as illustrated, the wand 20 may have an extension 60 that is configured to cooperate with a gear feature 62. As shown by FIG. 11A, when the wand 20 is in its stowed position, the extension 60 and gear feature 62 define a first outward position. As the gear 56 moves, its gear feature 62 (illustrated as a raised protrusion on the gear that is received by the elongated extension 60 of the wand 20) pushes the wand 20 toward its extended position via movement of the gear feature 62 with respect to the extension 60. FIG. 11B illustrates the wand 20 beginning to exit the interior garage space 28 via a door 32. FIG. 11C illustrates the wand 20 in its extended position. It should be understood that garage door 32 is an optional feature and need not be provided for functioning.

Figure 12:
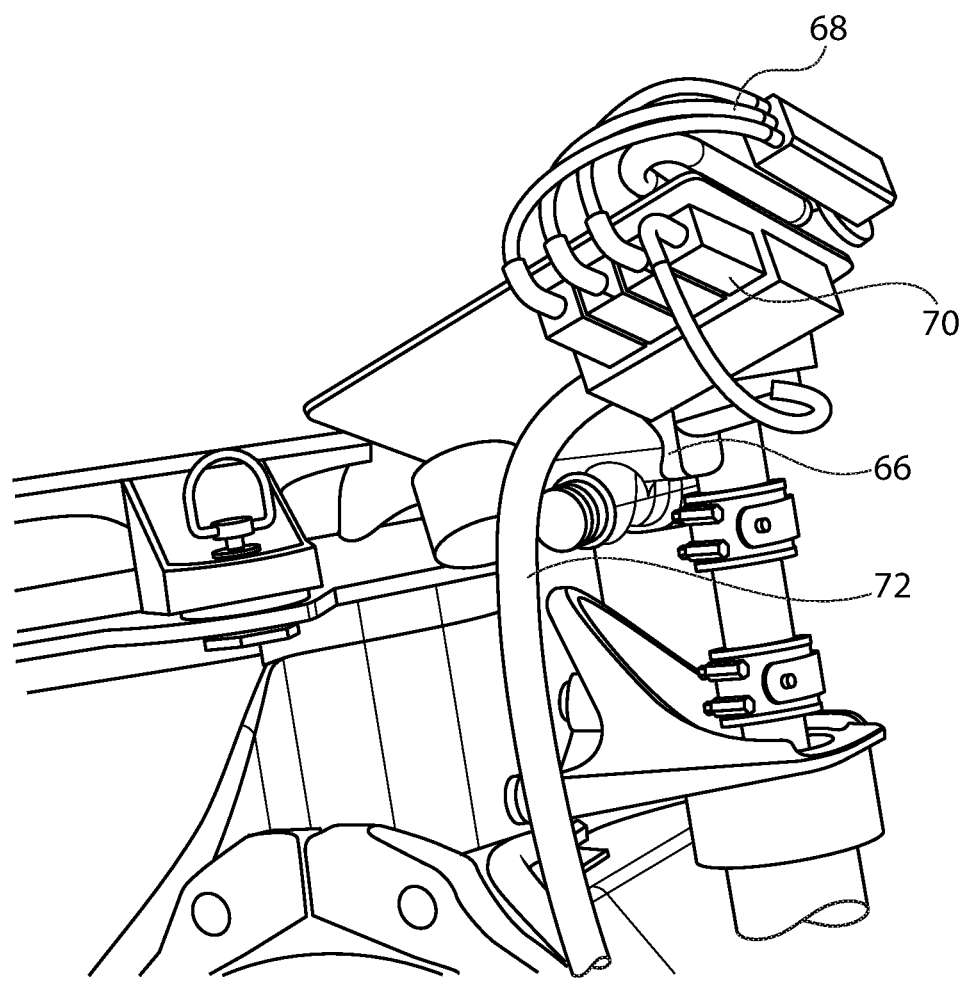
FIG. 12 illustrates a rear perspective view of one embodiment of a water system for delivering water to the wand.

These images also illustrate the presence of one or more wand jets 64. The wand jets 64 are designed as one or more openings in the wand 22 which enable the flow of fluid therethrough. As illustrated by FIGS. 11C and 12, a rear portion 66 of the wand cooperates with one or more wand jet water lines 68. Wand jet water lines 68 also cooperate with micro valves 70 which can help adjust various delivery features of the water. Micro valves 70 cooperate with a main water supply line 72. The main water supply line 72 may fluidly cooperate with any appropriate water source acceptable for delivering bidet rinse water.

Figure 13:
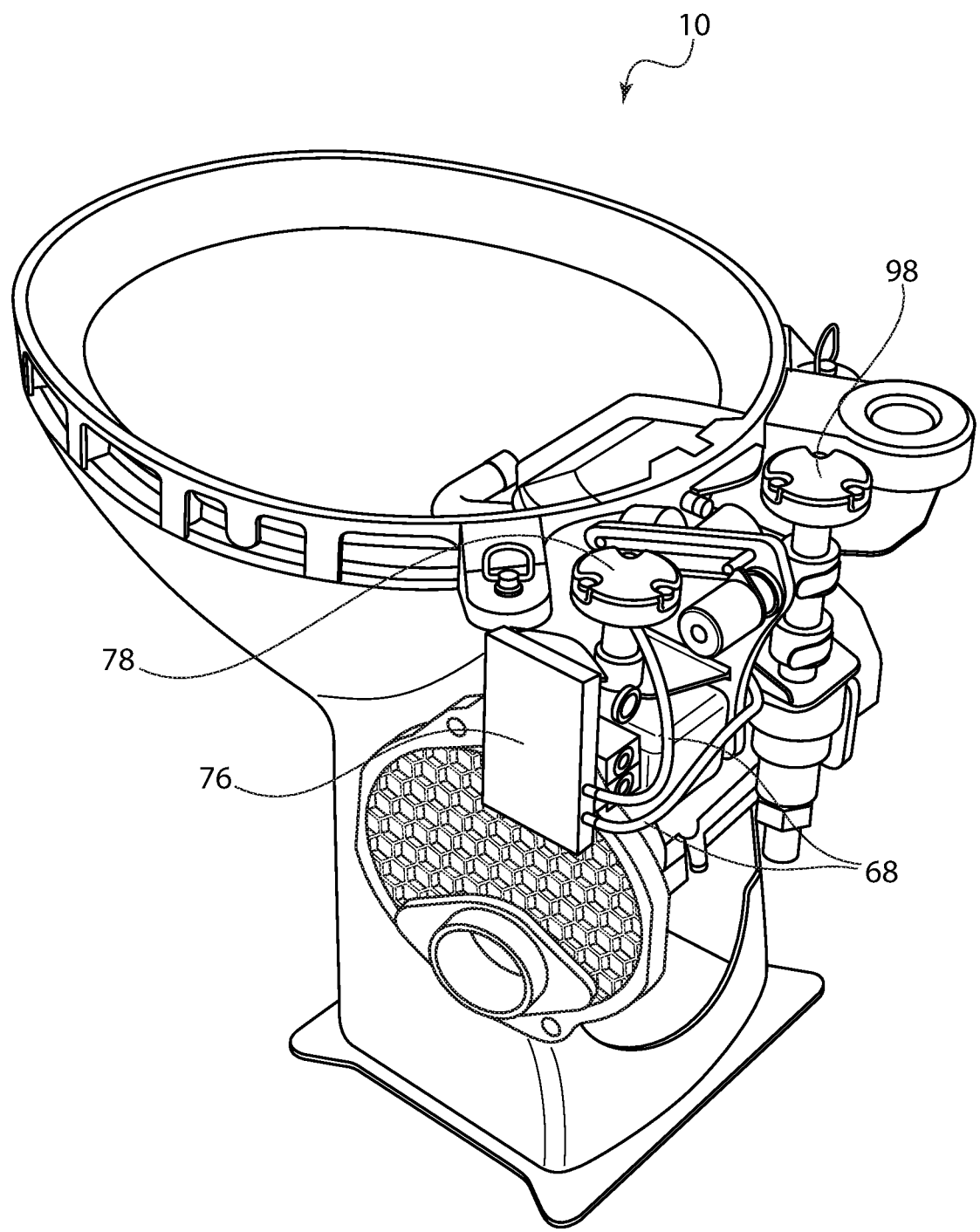
FIG. 13 illustrates a rear perspective view of an alternate embodiment of a water system for delivering water to the wand.
Figure 14:
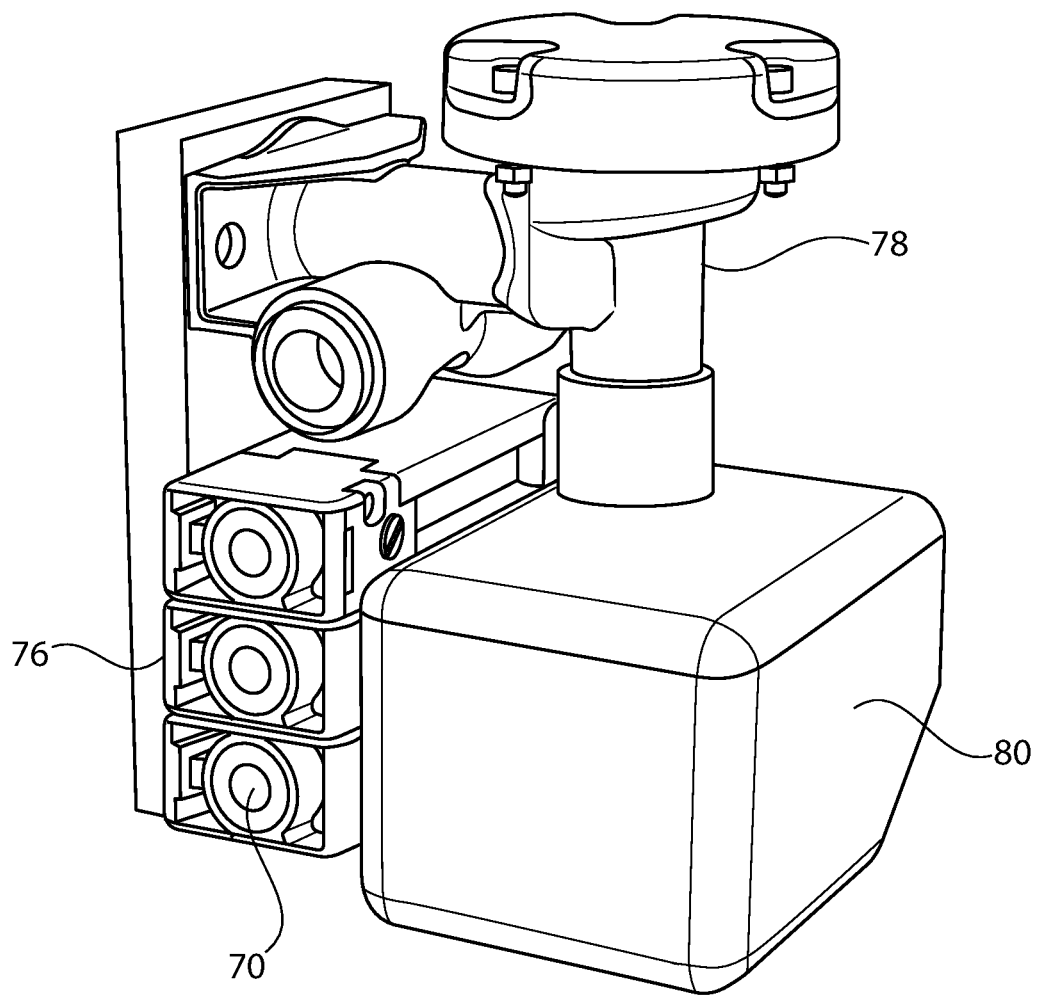
FIG. 14 shows a close-up view of an anti-siphon valve and a heating unit for use in connection with the toilet bidet system.

In an alternate example, the micro valves may be micro solenoid valves as illustrated by FIGS. 13 and 14. These valves 70 may switch between delivering rinse water to the wand jets 64 and the rinse jets and/or rinse bar 36. A fluid manifold board 76 may help channel water between various components. As illustrated by FIG. 13, the board 76 may cooperate with one or more wand jet water lines 68. These figures also illustrate a bidet anti-siphon valve 78 (in addition to the toilet anti-siphon valve 98). The bidet anti-siphon valve 78 may help prevent water in the bidet rinse system from returning back to the water source, which may be a potable water source, preventing contamination.

A heating unit 80 may also be provided. Heating unit 80 may be an on-demand water heater. This allows instant temperature changes in the water to be delivered and can help eliminate the need to heat large amounts of water, saving energy. In specific examples, the heating unit 80 is provided in line with the water delivery system.

Figure 15:
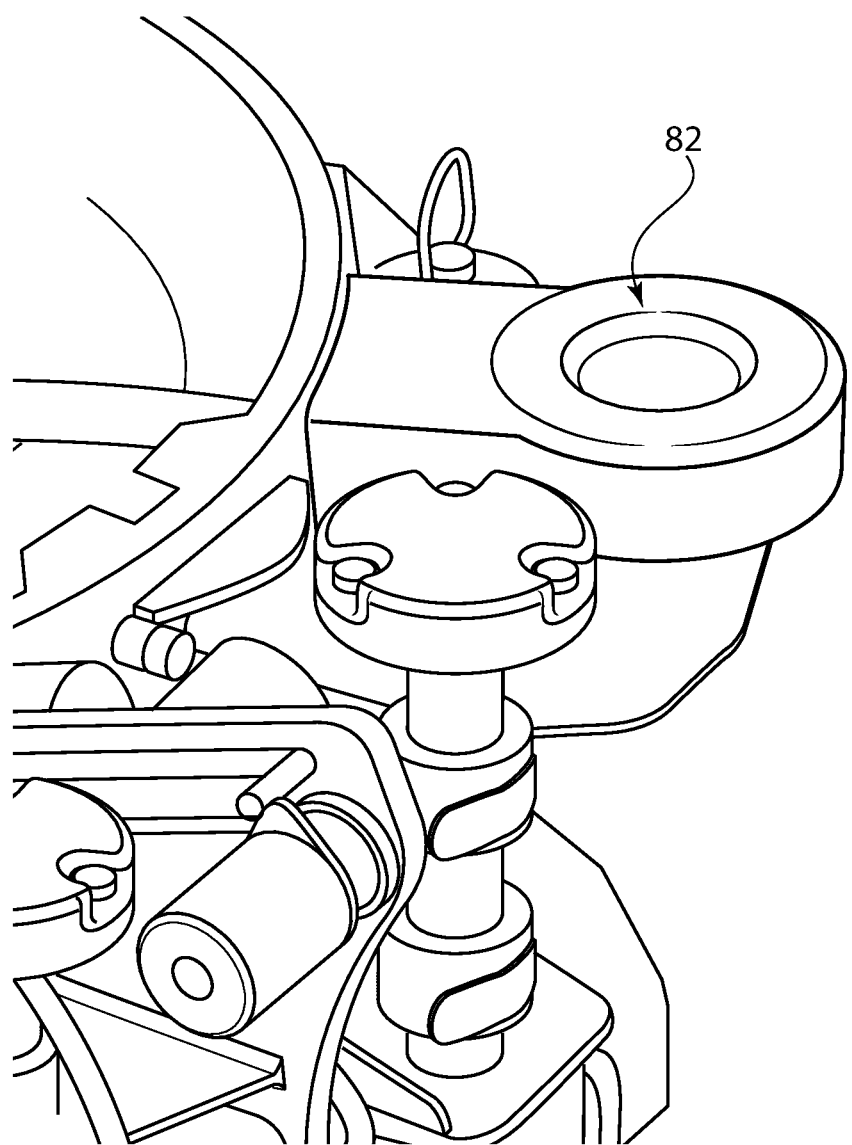
FIG. 15 illustrates a top perspective view of a dryer feature for use in connection with the toilet bidet system.

FIG. 15 illustrates a dryer feature 82. The dryer feature 82 may be designed to blow warmed air, which can dry to user after use of the toilet bidet system 10.

Figure 16:
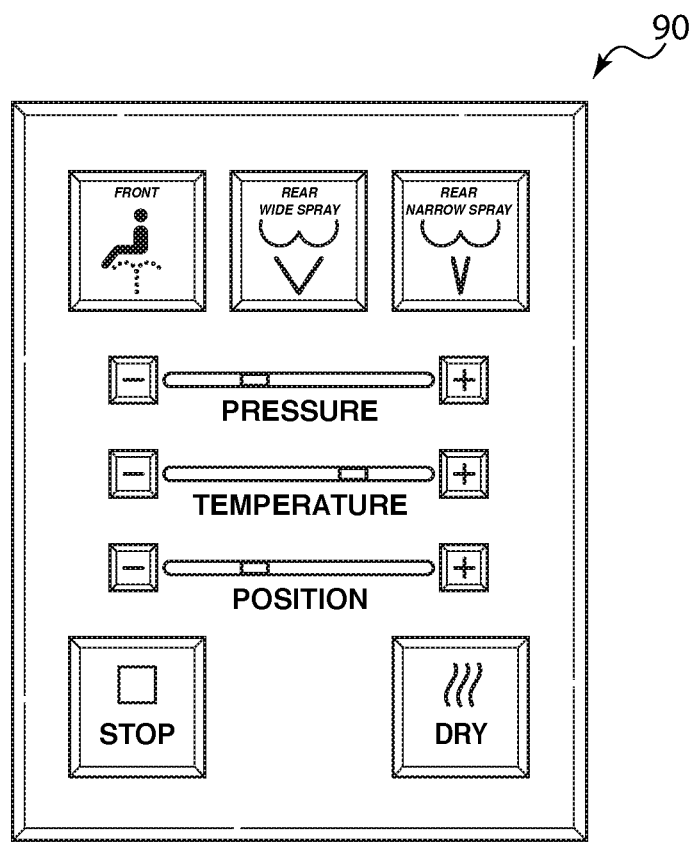
FIG. 16 illustrates one embodiment of a control panel for use in connection with the toilet bidet system.
Figure 17:
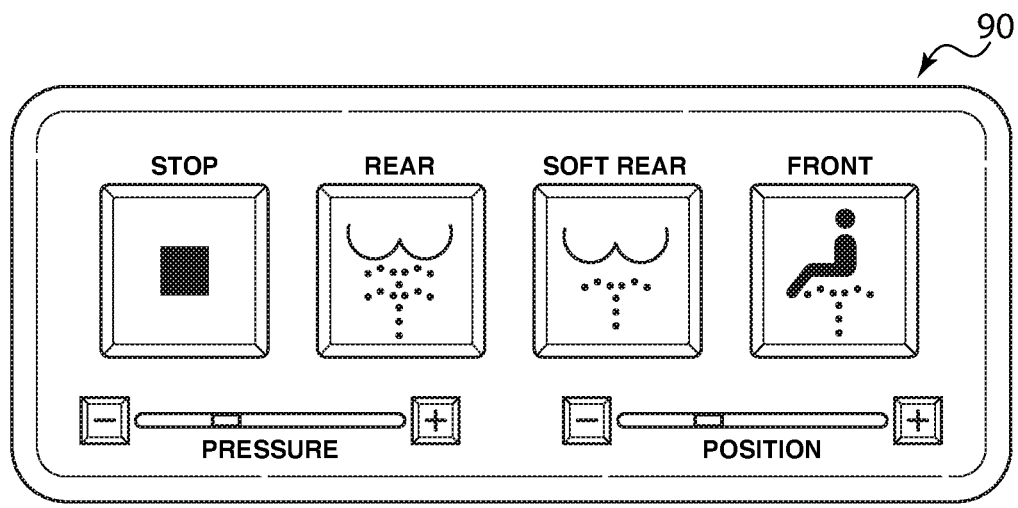
FIG. 17 illustrates an alternate embodiment of a control panel for use in connection with the toilet bidet system.

The user may be able to control various water delivery features. Non-limiting examples include water temperature, water pressure, wand position, spray volume and area, drying, or any other features. A control panel 90 may be mounted near the installation location of the toilet bidet system. In one example, the control panel is mounted on a wall or cabinet in the lavatory, within reach of the user in use. Exemplary control panels are illustrated by FIGS. 16 and 17. Once the wand has been activated, the user may adjust various features in order to customize the desired experience. It should be understood that alternate designs are possible and considered within the scope of this disclosure.

It is generally envisioned that the bidet rinse water will be pulled from a fresh water source. This is often the freshwater/potable water tank onboard the vehicle. However, current technology has allowed filtering of grey water (a term used to refer to used sink water from hand-washing or other activities) to be filtered to a level sufficient for toilet flushing use. It is envisioned that technology may evolve to a point that grey water may be sufficiently filtered and sterilized for its use in connection with a bidet flush.

The wand may be provided as having an automatic drain feature, such that all water from a first use is drained from the wand prior to a second use. This can help prevent standing water within the wand from becoming too cold for the next user. This can also prevent standing water within the wand from freezing when the aircraft is not in use. (This may be accomplished via drains used in other aircraft systems such as coffeemakers, steam ovens, etc. Non-limiting examples include gravity drains and air mast drains.)

Contrary to home use bidets that use rotary valves, the valves of the toilet bidet system described herein should be aerospace-grade solenoids or micro solenoids. Aircraft and other passenger transportation vehicles are subject to vibrations and potential impacts that are not experienced by home or land-based bidet systems. Accordingly, the valves and controls used in connection with the toilet bidet system described herein should be aerospace-grade and tested to meet current federal regulations and requirements.

The bidet rinse ring 12 described herein may be provided on the manufactured toilet when delivered from the factory. In other examples, the bidet rinse ring 12 may be interchanged with a standard rinse ring 18 in order to convert a toilet to a toilet bidet system described herein. This conversion may be accomplished during an overnight service. Once the bidet rinse ring is positioned, the wand is installed and water lines are connected. A user control panel may be installed near the toilet in order to allow user control of various water qualities, such as rinse water temperature, pressure, delivery direction, water delivery amount, or any combination thereof.

Because the toilet bidet system described herein may experience heavier use than a traditional home or land-based bidet system, it is possible to provide one or more antimicrobial coatings on various features described herein, specifically on the wand. The wand may also be designed to be self-cleaning, such that after a specified number of uses, fresh water is caused to be run through the wand. The UV sterilization lights or silver oxide nanoparticles described above are also possible cleaning options that may be implemented.

Changes and modifications, additions and deletions may be made to the structures and methods recited above and shown in the drawings without departing from the scope or spirit of the disclosure or the following claims.

What is claimed is:

1. A toilet bidet system that is configured to be positioned onto a separate toilet frame comprising a rim and a standard removable rinse ring, the toilet bidet system comprising:
a bidet rinse ring configured to cooperate with the rim of the toilet frame, the bidet rinse ring comprising a wand housing and a wand support, wherein the bidet rinse ring is interchangeable with and replaces the standard removable rinse ring and is removable from the toilet frame.

2. The system of claim 1, wherein the bidet rinse ring replaces a standard rinse ring of a vacuum toilet.

3. The system of claim 1, further comprising a bidet wand.

4. The system of claim 1, wherein the wand housing defines an interior garage space.

5. The system of claim 1, further comprising a wand disinfection system.

6. The system of claim 5, wherein the disinfection system comprises one or more UV LEDs positioned within the wand housing.

7. The system of claim 1, wherein the wand housing comprises flanges configured to define an interior garage space for the wand.

8. The system of claim 1, wherein the wand housing comprises a closure flap or door.

9. The system of claim 1, wherein the wand housing comprises a rinse bar comprising one or more rinse jets, one or more individual rinse jets, or a combination thereof.

10. The system of claim 1, further comprising a drive system configured to actuate movement of the wand.

11. The system of claim 10, wherein the drive system comprises a toothed timing belt and a motor wand gear.

12. The system of claim 10, wherein the drive system comprises a moon gear feature with a protrusion that cooperates with an extension of the wand.

13. The system of claim 1, further comprising one or more micro valves configured to control water delivery through the bidet rinse ring.

14. The system of claim 1, further comprising a bidet rinse ring anti-siphon valve.

15. The system of claim 1, further comprising a heating unit.

16. The system of claim 15, wherein the heating unit is plumbed in line with one or more water supply lines.

17. The system of claim 1, further comprising a dryer feature.

18. The system of claim 1, further comprising a user control panel with user controls configured to customize the temperature, pressure, direction, amount, or any combination thereof of rinse water delivered through the bidet rinse ring.

19. A toilet bidet system that is configured to be positioned onto a separate toilet frame comprising a rim and a standard removable rinse ring, the toilet bidet system configured for use on a passenger transportation vehicle, the toilet bidet system, comprising a bidet rinse ring configured to cooperate with the rim of the toilet frame, wherein the bidet rinse ring is interchangeable with and replaces the standard removable rinse ring and is removable from the toilet frame, the bidet rinse ring comprising a wand housing, a wand comprising one or more wand jets, wherein the wand is fluidly cooperable with one or more water lines configured to deliver rinse water through the one or more wand jets, and a control panel with user controls configured to customize the temperature, pressure, direction, amount, or any combination thereof of the delivered rinse water.

20. The system of claim 19, wherein the passenger transportation vehicle comprises an aircraft.

* * * * *